Aug. 13, 1935.  K. V. ENGMAN  2,011,313
LOCKING DEVICE FOR BOARDS OR SIMILAR STRUCTURAL ELEMENTS
Filed Dec. 29, 1933
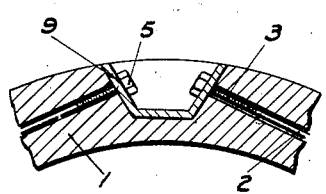
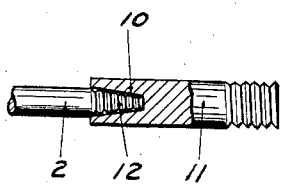
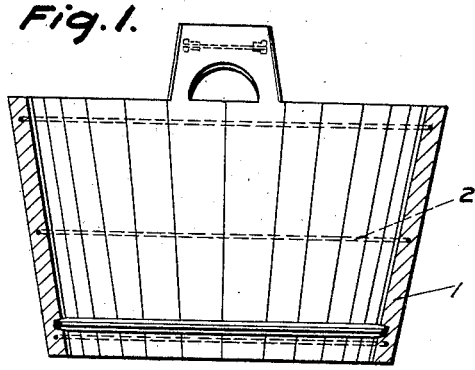
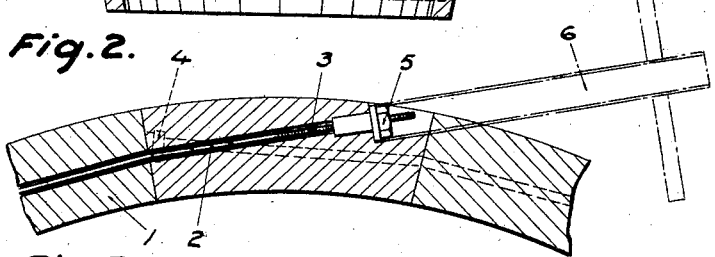
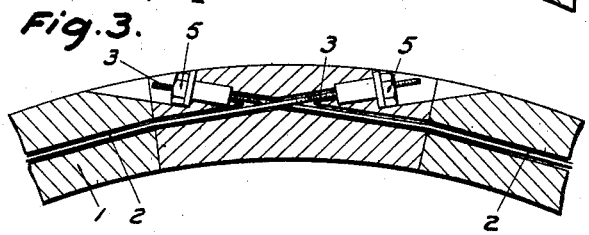
WITNESSES:
INVENTOR:

Patented Aug. 13, 1935

2,011,313

UNITED STATES PATENT OFFICE 2,011,313

LOCKING DEVICE FOR BOARDS OR SIMILAR STRUCTURAL ELEMENTS

Karl Vilhelm Engman, Uppsala, Sweden, assignor, by mesne assignments, to Theodor Pettersson, Broddbo, Sweden Application December 29, 1933, Serial No. 704,520
In Sweden October 20, 1933

8 Claims. (Cl. 217—95)

The present invention relates to means for fastening and/or tensioning the end or ends of wires, strips or similar connecting members, drawn through transverse holes in boards or similar structural elements arranged edgewise or edge by edge in relation to one another in order to obtain a barrel, pipe, air-craft body or similar bodies, said means being so adapted as to allow tensioning of the connecting members from a given desired point at the surface of the body, for instance at the periphery of the barrel, vat or the like. This object is attained by extending the end or ends of the wire etc. onto the surface of the body and tensioning the wire etc. at this place by means of a nut, wedge, eccentric or similar means.

It has been found to be difficult, in such cases, to fasten and to tension the connecting elements in a convenient and reliable manner, as great demands are laid on such fastening and tensioning means. The device shall not only have a very high strength in combination with a minimum demand for space but also a very high degree of adjustability. In order to tension the two ends of a connecting member it has, for instance, been proposed to use a nut which at its one end is right-hand threaded and at its opposite end left-hand threaded and in which the correspondingly threaded ends of a connecting member are inserted. In order to make the nut accessible for tensioning it is at one point on the surface of the body formed with a hexagonal head or the like so as to allow straining of the nut through holes provided in the wall of the body. One drawback of this device resides in the nut requiring large space, in thin boards for barrels or the like taking up too great a portion of the wall thickness so that the wall will be very weakened. Another important drawback resides in the fact that the nut must have a considerable length in order to allow the great adjustability which often is necessary. Wood may, for instance, swell or shrink not less than 10% of the width, representing in case of a vat of a diameter of 1 meter a maximal peripheral variation of about 30 cm.

These drawbacks are eliminated by the present invention by which a convenient and elegant locking device is provided which may be used for wood of small thickness and also in such cases in which great adjustment is required.

The invention will be more fully described with reference to the accompanying drawing in which connection also other features characterizing the invention will be set forth.

Fig. 1 is a longitudinal sectional view through a vat provided with a locking device according to the invention. Fig. 2 is a cross-sectional view through the board in which the locking device is secured. Fig. 3 shows another embodiment in which both ends of the wire are threaded and capable of being strained. Fig. 4 shows a washer common to both ends of the wire. Fig. 5 shows suitable means for fastening one end of the wire.

In the figures reference numeral 1 designates boards, 2 wires, 3 a thread provided on one end of the wire, 4 anchoring means for the opposite end of the wire and 5 a tightening nut.

In Fig. 2 reference numeral 6 designates a wrench adapted to tighten the nut.

In Fig. 4 reference numeral 9 designates a fastening disk common to both ends of a wire.

In order to fasten the wire to the nut, wedge or the like effecting the tensioning of the wire, the latter may be provided with a thread, a loop or the like. Another manner which has been examined and shown to be very effective is to provide the one end of the wire with a conical thread and to insert said end under a considerable pressure into a corresponding conical hole in a bolt or the like of softer material than that of the wire, for instance brass. The wall of the hole may be plain. Such an embodiment is shown in Fig. 5 in which reference numeral 10 designates a conical in a bolt 11 and reference numeral 12 the threaded or chamfered end of the wire of a conicity corresponding to that of the hole 10. Tests have shown that such a fastening means has an astonishing high strength. So, for instance, a wire of a diameter of 3 mm. pressed into a hole of a depth of 7 mm. in a bolt of a diameter of 5 mm. has been shown to withstand a stress of 700 kg. per square centimeter, that is a stress considerably surmounting the allowable stress of the wire.

The locking device according to the invention is designated to be used for bodies of different kinds, consisting of boards placed edgewise or edge by edge in relation to each other and held together by wires, strips or other connecting members drawn transversely through the boards from edge to edge. By preference the locking device is designated to be used for bodies having curved surfaces, where it is preferably disposed on the convex surface, but it may also be applied to the concave surface as well as to bodies having plane surfaces.

Examples on bodies to which the locking device may be applied are barrels, vats, churns, pipes, air-craft bodies, boats, pontoons, masts and the like.

The design in detail of the locking device according to the invention may be varied in several respects without departing from the scope of the following claims.

What I claim is:—

1. In a structure composed of a plurality of structural elements arranged edge by edge, coinciding transverse holes through said elements, a connecting member drawn through said holes, means to anchor one end of said connecting member to one of said elements, the other end of the connecting member extending to the surface of the same element, and means in combination with said last-mentioned end to tension the member.

2. In a structure composed of a plurality of structural elements arranged edge by edge, coinciding transverse holes through said elements, a connecting member drawn through said holes and having its ends crossing each other in one of said structural elements, means to anchor one of said ends to said element, the other end of the member extending to the surface of said element, and means in combination with said last-mentioned end to tension the member.

3. In a structure composed of a plurality of structural elements arranged edge by edge, coinciding transverse holes through said elements, a connecting member drawn through said holes, means to anchor one end of said member to one of said elements, the other end of the member being extended to the surface of said element and having a threaded end, and a nut threaded onto said threaded end to tension the member.

4. In a structure composed of a plurality of structural elements arranged edge by edge, coinciding transverse holes through said elements, a connecting member drawn through said holes and having its ends extended to the surface of the structure, and common fastening means for said ends adapted to tension the member.

5. In a structure composed of a plurality of structural elements arranged edge by edge, coinciding transverse holes through said elements, a connecting member drawn through said holes and having a conical end, a bolt having a conical hole into which said conical end is inserted, means in combination with said conical end and said bolt to increase the frictional engagement between them, the bolt being so located as to be accessible from the surface of the structure and means in combination with said bolt for tensioning the member.

6. In a structure composed of a plurality of structural elements arranged edge by edge, coinciding transverse holes through said elements, a connecting member drawn through said holes and having a conical chamfered end, a bolt having a conical hole into which said conical end is inserted, the bolt being so located as to be accessible from the surface of the structure, and means in combination with said bolt for tensioning the member.

7. In a structure composed of a plurality of structural elements arranged edge by edge, coinciding transverse holes through said elements, a connecting member drawn through said holes and having a conical end, a bolt of a material softer than that of the connecting member and having a conical hole into which said conical end is inserted, means in combination with said conical end and said bolt to increase the frictional engagement between them, the bolt being so located as to be accessible from the surface of the structure and means in combination with said bolt means for tensioning the member.

8. In a structure composed of a plurality of structural elements arranged edge by edge, coinciding transverse holes through said elements, a connecting member drawn through said holes and having its ends extended to the surface of one of said elements, a common fastening member for said ends and means in combination with one of the ends and with said fastening member to tension the connecting member.

KARL VILHELM ENGMAN.